United States Patent [19]
Levine

[11] Patent Number: 4,762,193
[45] Date of Patent: Aug. 9, 1988

[54] MOTORIZED GOLF TROLLEY

[75] Inventor: Sidney S. Levine, Congleton, England

[73] Assignee: Dorothy Margaret Levine, United Kingdom

[21] Appl. No.: 5,577

[22] Filed: Jan. 16, 1987

[30] Foreign Application Priority Data

Jan. 18, 1986 [GB] United Kingdom ............... 8601196

[51] Int. Cl.$^4$ .............................................. G62B 1/02
[52] U.S. Cl. ................................. 180/65.1; 280/472; 280/DIG. 5
[58] Field of Search .............. 280/40, 641, 645, 646, 280/651, 655, 47.17, 47.18, 47.2, DIG. 5, DIG. 6; 180/65.1, 65.6, 19.1

[56] References Cited

U.S. PATENT DOCUMENTS

| | | | |
|---|---|---|---|
| 2,574,232 | 11/1951 | Welsh | 280/DIG. 6 |
| 3,820,617 | 6/1974 | Groff | 280/DIG. 5 |
| 4,570,732 | 2/1986 | Craver | 280/DIG. 6 |
| 4,657,100 | 4/1987 | Lewis | 280/DIG.5 |

Primary Examiner—John J. Love
Assistant Examiner—Richard Camby
Attorney, Agent, or Firm—W. Thad Adams, III

[57] ABSTRACT

A motorized golf trolley has a frame structure comprising three tubular frame members, a first member co-axially surrounding a drive axle for wheels (10), a second member (28) secured to the first frame member and slidably locating a handle member (30), and a third frame member (52) secured to the first member and slidably locating a bag support structure. The first frame member also mounts a motor and gearbox unit while the third member (52) provides a mounting (54) for a battery (56). A golf bag (48) can be located on a plate (70) of the bag support structure and rest at its upper end against a bag support (38) mounted on the handle member (30). The construction provides a relatively stronger, lighter, and cleaner apparatus employing good engineering standards and can be dismantled for transport and storage if required.

9 Claims, 4 Drawing Sheets

MOTORIZED GOLF TROLLEY

This invention relates to apparatus for carrying a golf bag with associated golf equipment and of the motorised type, known as a "golf trolley".

Heretofore motorised golf trolleys have been constructed from frames having numerous brackets and attachments, resulting in such trolleys being relatively expensive to manufacture, and heavy and cluttered in appearance. Many such trolleys, because of their construction, do not employ sufficiently high engineering standards and have a relatively short life with relatively poor performance.

According to the present invention there is provided apparatus for carrying a golf bag, the apparatus comprising a ground engageable wheel arrangement, means for driving the ground engageable wheel arrangement, and frame means co-axially surrounding a drive axle for the wheel arrangement, the frame means being adapted to mount a handle structure, and to mount a golf bag support structure.

Preferably the wheel arrangement comprises a pair of spaced driving wheels, the drive axle extending between the wheels and being operatively connected to a drive motor which is mounted on the frame means.

Preferably also the frame means comprises a first tubular member co-axially surrounding the drive axle, a second tubular member connected to the first tubular member and mounting the handle structure, and a third tubular member connected to the first tubular member and mounting the bag support structure.

The handle structure and the bag support structure may be each removably connected to the respective tubular member. Desirably the handle structure includes a part which is slidably locatable in the second tubular member, with means being provided for locking the part to the latter, and the bag support structure includes a part which is slidably locatable in the third tubular member, with means being provided for locking the part to the latter.

The third tubular member may provide a mounting for a battery, while the handle structure may provide a further support for a golf bag.

Additionally the drive axle may locate at each end in a wheel hub of the respective driving wheel and may be operatively connected thereto by a one-way coupling arrangement so that the wheels are driven in one direction of rotation but can overun the drive axle.

An embodiment of the present invention will now be described by way of example only with reference to the accompanying drawings, in which.

Figure 1:
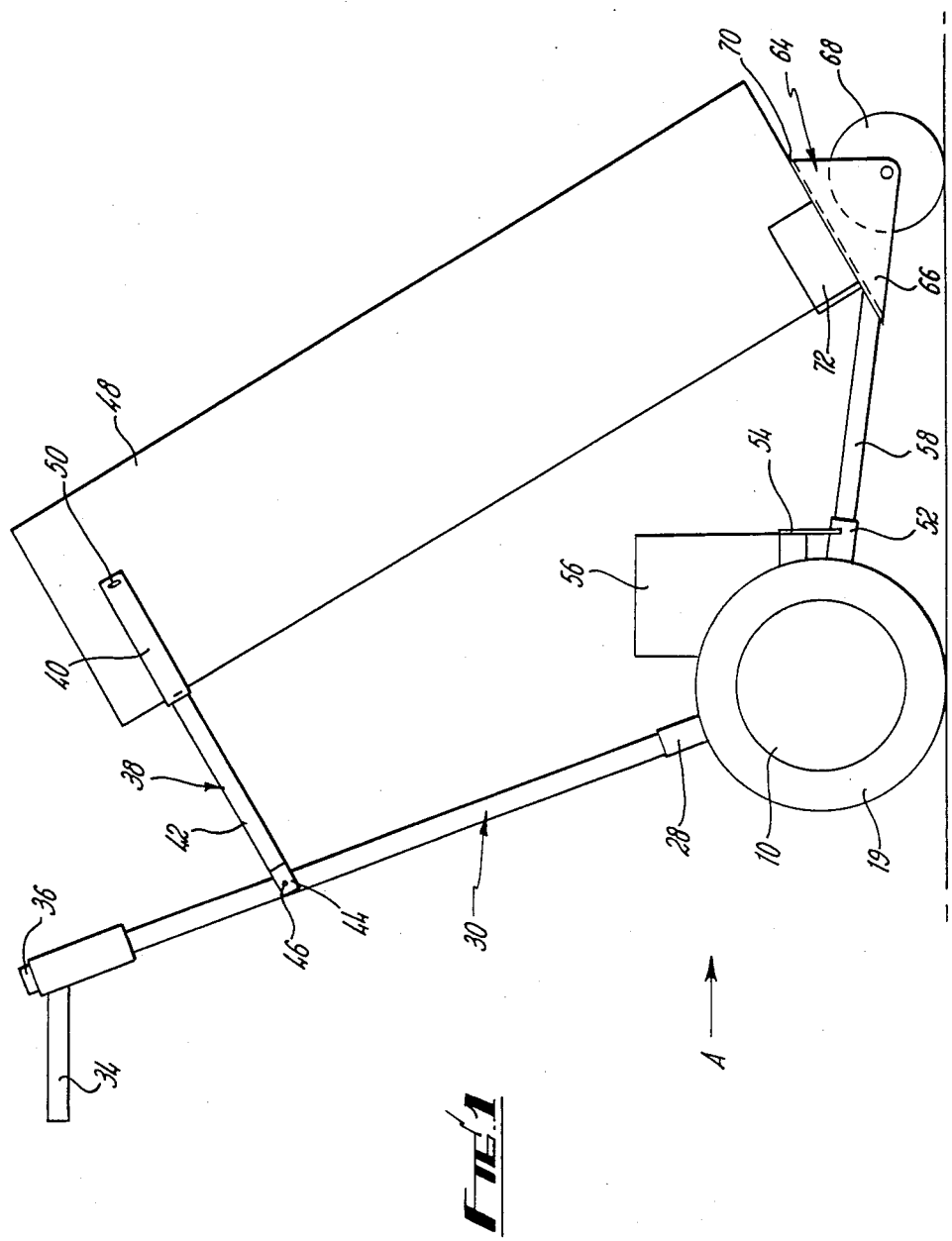
FIG. 1 is a side elevation of an apparatus according to the invention.
Figure 2:
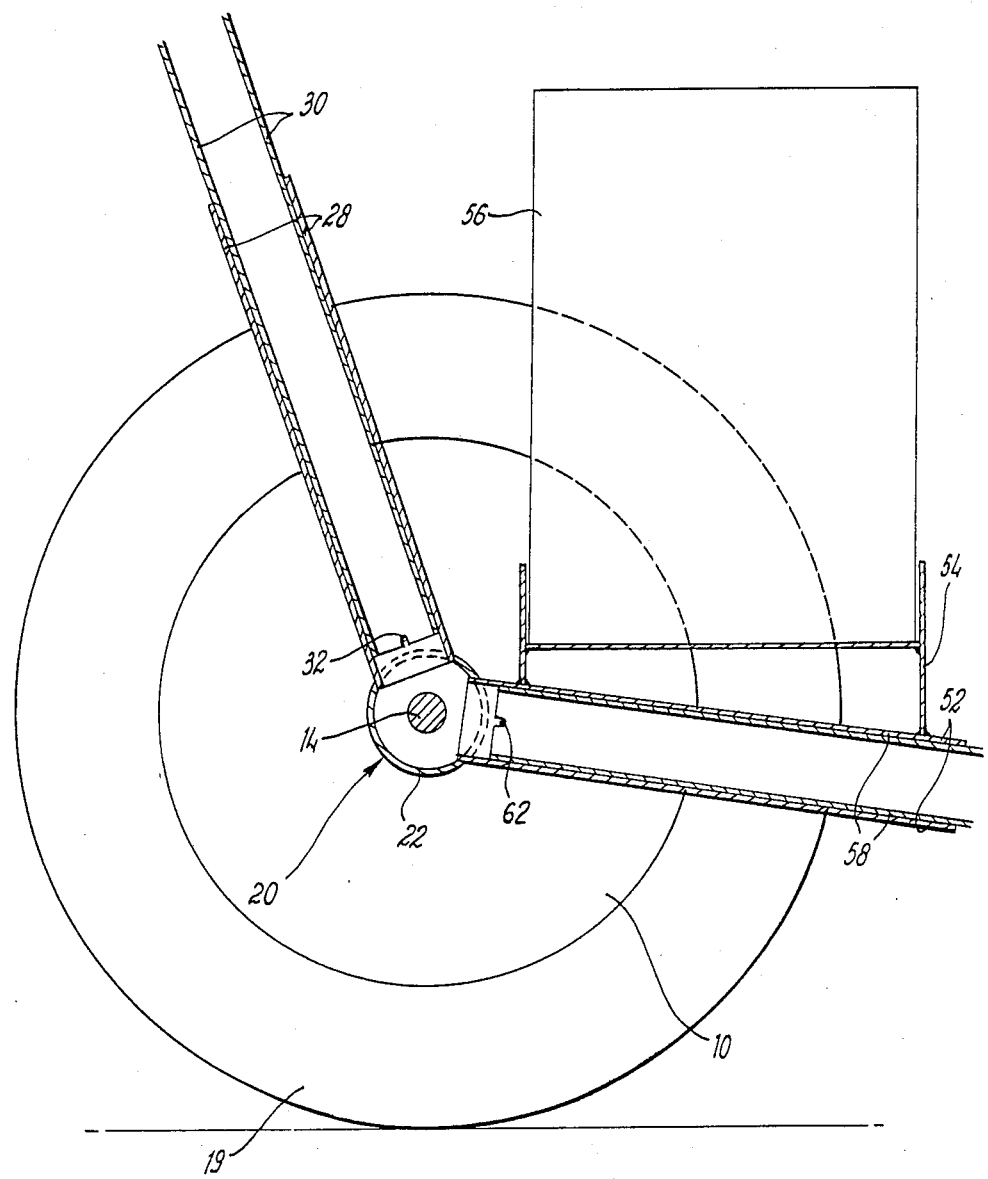
FIG. 2 is an enlarged sectional side view through part of the apparatus of FIG. 1.
Figure 3:
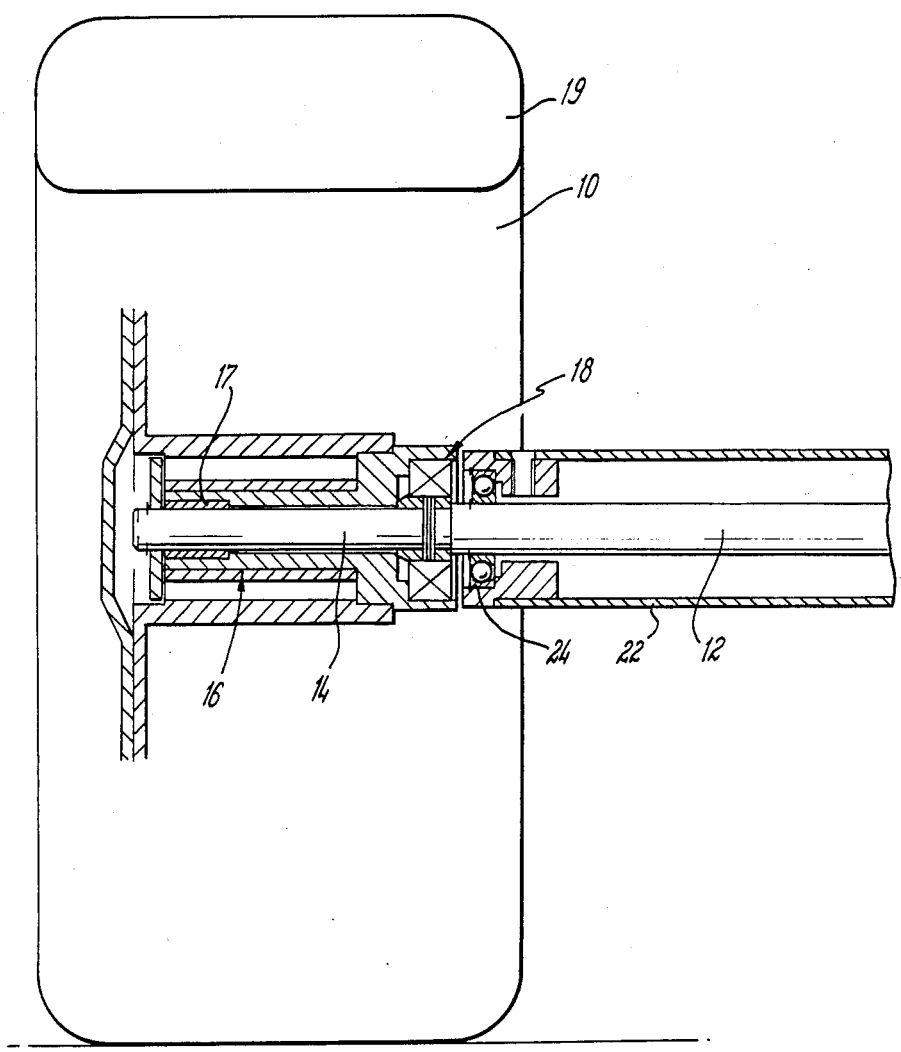
FIG. 3 is a sectional view of a wheel assembly.
Figure 4:
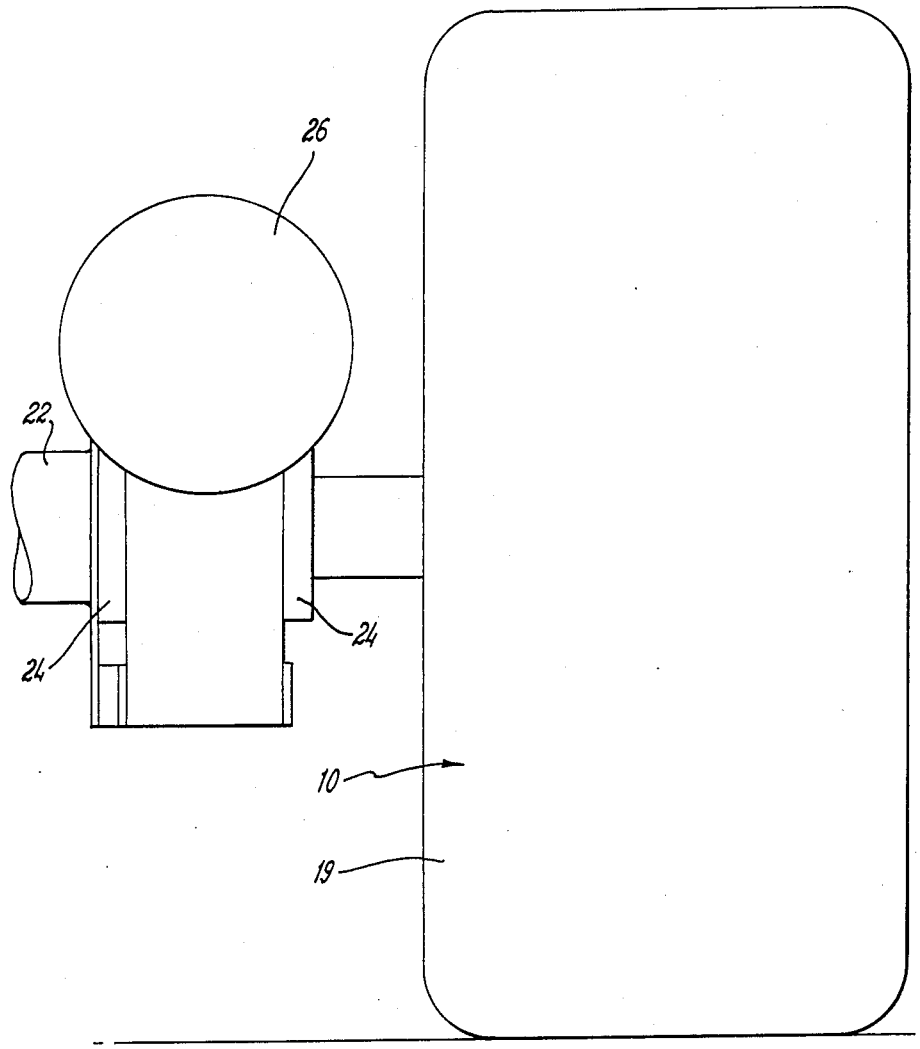
FIG. 4 is a front view of part of the apparatus.

Referring to the drawings, an apparatus in the form of a motorised golf trolley has a pair of ground engageable wheels 10 spaced apart on a drive axle 12 which has reduced diameter ends 14 locating in respective hubs 16 of the wheels 10 via needle bearings 17. The drive axle 12 is operatively connected to each wheel hub 16 by means of a one-way clutch 18, whereby the axle 12 can drive the wheels 10 in one direction of rotation but the wheels 10 can overun the driven axle in this direction. The wheels 10 have suitable tires 19 for golf course use.

A frame structure 20 comprises a first tubular frame member 22 co-axially surrounding the drive axle 12. The first member 22 provides a mounting for a motor and gearbox unit 26 located towards one of the wheels 10, the motor having an electronic speed control (not shown), and there being an operative connection between the motor and gearbox and the drive axle 12. The frame member 22 carries precision bearings 24 for supporting the axle 12, one of the bearings 24 being carried in the member 22 at the end further from the unit 26, and others of the bearings 24 being incorporated in the unit 26.

The frame structure 20 further includes a second tubular frame member 28 fixedly secured to the frame member 22 substantially midway along the length thereof to extend substantially radially outwardly therefrom upwardly and to one side of a vertical plane through the centre of the tubular member 22. The member 28 defines a socket having an open end within which can be slidably located one end of a tubular handle member 30. The latter has slots in said one end to engage over a locating pin 32 within the member 28, means (not shown) being provided for locking the handle member 30 to the frame member 28. At its other end the handle member 30 mounts a handle 34, preferably in the form of a pistol grip, housing an on/off switch and a potentiometer operable, by way of a control knob 36, by a thumb or finger of the hand of a person steering the trolley, the potentiometer being electrically connected to, for controlling of, the electronic speed control unit for the drive motor and an on/off switch. The handle 34 is removably mounted and can be positioned in any of a number of positions on the member 30 to suit the operator.

Attached to the handle member 30, intermediate of the ends thereof, is a bag support in the form of an arcuate strip 40 mounted on one end of a tubular bar 42, the latter having mounting lugs 44 whereby to be mounted on the handle member 30 by means of a mounting pin 46 extending through aligned apertures. The bag support 38 can be folded towards the plane of the handle member 30 when not in use and is self-locking when in use extending from the handle member 30 as shown in the drawings. The arcuate strip 40 can embrace an upper end of a golf bag 48 and has holes 50 in its respective ends for fastening of a strap or cord so as to secure the bag 48 to the trolley.

A third tubular member 52 of the frame structure 20 is fixedly secured to the first tubular member 22 at a location substantially midway along the length thereof. The member 52 extends substantially radially outwardly from the member 22 towards the other side of the vertical plane through the centre of the member 22 and downwardly relative to a horizontal plane therethrough. The frame member 52 has fixedly secured thereto a mounting 54 which locates a battery 56.

A bag support structure includes a tubular part 58, one end of which slidably locates in the frame member 52, slots are provided in said one end to engage on a locating pin 62 within the member 52, and locking means (not shown) being provided. At its other end the tubular part 58 mounts a third wheel assembly 64. The latter is defined by a pair of brackets 66 connected to the other end of the tubular part 58, the brackets 66 being spaced apart and rotatably mounting at a lower edge a third wheel 68. The brackets 66 mount an upper plate 70 providing a support surface for a lower end of the golf bag 48. An arcuate locating strip 72 is mounted to one side of the plate 70 and the bag 48 can be partly embraced thereby.

In use, the golf bag 48 is positioned on the plate 70 and against the support strip 72 as shown in FIG. 1, wherein the bag 48 also rests on the arcuate strip 40. The bag 48 is secured in position by a suitable strap or cord attaching to the strip 40. The trolley can be steered using the handle 34 and can be powered in one direction, generally in the direction 'A' as shown in FIG. 1, when the motor and gearbox unit 26 is operative. Operation of the motor and control of the speed of rotation is effected by the knob 36. The one-way coupling between the drive axle 12 and the wheels 10 permits the trolley to be moved in the direction of arrow A, but enables overunning of the axle 12 when the trolley is hand pushed in the same direction. This can also provide a differential to enable turning and cornering, and further provides for use in the event of battery or electrical failure. The trolley can be pulled in the reverse direction, the wheels, through the clutch, locking onto the axle 12 and turning the latter through the reduction gearbox and motor.

After use the bag 48 can be removed from the trolley, the handle structure 30 can be detached from the frame structure 20 if required, and the bag support 38 can be folded to its non-use position. The third wheel assembly 64 can also be detached from the frame structure 20 if desired.

There is thus provided an apparatus which can be constructed relatively inexpensively, is relatively stronger, lighter, and cleaner in appearance than existing apparatus. The construction allows the working parts to be mounted in a manner that employs good engineering standards and therefore provides for a longer life and better performance. The apparatus is easy to control and reduces in size considerably for storage and transportation.

I claim:

1. Apparatus for carrying a golf bag, the apparatus comprising a ground engageable wheel arrangement, means for driving the ground engageable wheel arrangement, and frame means comprising a first single elongate tubular member co-axially surrounding a drive axle for the wheel arrangement along at least more than one half of the length of the drive axle, a second single tubular member connected at one end to the first single tubular member intermediate the ends thereof and removably mounting a handle structure on the other end, and a third single tubular member connected at one end to the first single tubular member intermediate the ends thereof and removably mounting a bag support structure on the other end.

2. Apparatus according to claim 1, "wherein the handle structure includes a part which is slidably locatable in the second single tubular member, with means being provided for locking the part to the latter, and the bag support structure includes a part which is slidably locatable in the third single tubular member, with means being provided for locking the part to the latter."

3. Apparatus according to claim 1, wherein the third single tubular member provides a mounting for a battery.

4. Apparatus according to claim 1, wherein the handle structure provides a further support for a golf bag.

5. Apparatus according to claim 4, wherein the further support is movable between operative and nonoperative positions and is self-locking in the operative position.

6. Apparatus according to claim 1, wherein the handle structure mounts a handle which locates controls for the driving means, the controls including a knob operable by a person's hand on the handle.

7. Apparatus according to claim 6, wherein the handle is detachable and can be mounted in a selected one of a plurality of positions on the handle structure.

8. Apparatus according to claim 1, wherein the bag support structure provides a third wheel assembly presenting a support surface on which an end of a golf bag can be positioned.

9. Apparatus according to claim 1, wherein the drive axle locates at each end in a wheel hub and is operatively connected thereto by a one-way coupling arrangement so that the wheel arrangement is driven in one direction of rotation but can overrun the drive axle.

* * * * *